United States Patent
Jeong

(10) Patent No.: US 11,018,395 B2
(45) Date of Patent: May 25, 2021

(54) ELECTRODE ASSEMBLY AND MANUFACTURING METHOD THEREOF

(71) Applicant: LG Chem, Ltd., Seoul (KR)

(72) Inventor: Yu Na Jeong, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/863,465

(22) Filed: Apr. 30, 2020

(65) Prior Publication Data

US 2020/0365845 A1 Nov. 19, 2020

(30) Foreign Application Priority Data

May 14, 2019 (KR) .................. 10-2019-0056442

(51) Int. Cl.
*H01M 2/10* (2006.01)
*H01M 50/209* (2021.01)
*H01M 50/20* (2021.01)

(52) U.S. Cl.
CPC .......... *H01M 50/209* (2021.01); *H01M 50/20* (2021.01)

(58) Field of Classification Search
CPC .... H01M 2/1061; H01M 2/1077; H01M 2/14; H01M 2/1673; H01M 2/168; H01M 2/164; H01M 2/18
See application file for complete search history.

(56) References Cited

U.S. PATENT DOCUMENTS

2014/0038032 A1 2/2014 Lee et al.
2019/0165340 A1* 5/2019 Nitzani ............... H01M 2/1061

FOREIGN PATENT DOCUMENTS

| JP | 2010232265 A | 10/2010 | | |
|---|---|---|---|---|
| JP | 2013247031 A | 12/2013 | | |
| JP | 2015130292 A | 7/2015 | | |
| JP | 201929183 A | 2/2019 | | |
| KR | 20140017766 A | 2/2014 | | |
| KR | 20150032961 A | * 4/2015 | ........ | H01M 10/0436 |
| KR | 20150083518 A | 7/2015 | | |
| KR | 20160015846 A | 2/2016 | | |
| KR | 20160019284 A | 2/2016 | | |
| KR | 20160067451 A | 6/2016 | | |
| KR | 20160109408 A | 9/2016 | | |
| KR | 20170022589 A | * 3/2017 | ............ | Y02E 60/10 |
| KR | 20170022589 A | 3/2017 | | |

(Continued)

*Primary Examiner* — Stephan J Essex

(74) *Attorney, Agent, or Firm* — Lerner, David, Littenberg, Krumholz & Mentlik, LLP

(57) ABSTRACT

An electrode assembly and a method of manufacturing an electrode assembly are disclosed. The electrode assembly includes first unit cells having two negative electrodes, two separators, and a positive electrode in a stacked configuration, second unit cells having two positive electrodes, two separators, and a negative electrode in a stacked configuration, and a separator pouch made of the same material as the separators and bonded to and surrounding respective ones of the first unit cells or the second unit cells so that portions of each separator pouch comprise an uppermost layer and a lowermost layer of the respective surrounded unit cell, wherein a surplus portion of each separator pouch protrudes beyond peripheral ends of the first and second unit cells. The first unit cells and the second unit cells are alternately stacked, and the surplus portions of the separator pouches are bonded to each other.

10 Claims, 7 Drawing Sheets

(56) References Cited

FOREIGN PATENT DOCUMENTS

| KR | 20170124298 A | * | 11/2017 | ........ H01M 10/0431 |
| KR | 20180057847 A | * | 5/2018 | ............ H01M 10/04 |
| KR | 20180081926 A |   | 7/2018 | |

* cited by examiner

ELECTRODE ASSEMBLY AND MANUFACTURING METHOD THEREOF

CROSS-REFERENCE TO RELATED APPLICATIONS

This application claims priority to Korean Patent Application No. 10-2019-0056442, filed on May 14, 2019, in the Korean Intellectual Property Office, the disclosure of which is incorporated herein by reference.

BACKGROUND OF THE INVENTION

Field of the Invention

The present invention relates to an electrode assembly and a manufacturing method thereof, and more particularly, to a method for manufacturing an electrode assembly, which is capable of preventing or minimizing misalignment in a stacking direction when an electrode or a unit cell is stacked and is capable of removing a fixing tape according to a related art, and an electrode assembly manufactured by the manufacturing method.

Description of the Related Art

Batteries storing electrical energy may be generally classified into primary batteries and secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged, and when the oxidation reaction to the material is performed by the current, power is discharged. Here, such the charging-discharging are repeatedly performed.

Among various types of secondary batteries, lithium secondary batteries are generally manufactured by mounting an electrode assembly, in which a positive electrode (cathode), a separator, and a negative electrode (anode) are stacked, in a case. Here, as a process, in which lithium ions are intercalated and deintercalated from lithium metal oxide to the negative electrode, is repeated to charge and discharge the lithium secondary batteries.

A unit cell having a three-layer structure of a positive electrode/separator/negative electrode, a five or more-layer structure of a positive electrode/separator/negative electrode/separator/positive electrode or a negative electrode/separator/positive electrode/separator/negative electrode is repeatedly stacked in a fixed number, or the positive electrode, the separator, and the negative electrode are repeatedly stacked one by one to form one electrode assembly. Also, the electrode assembly is accommodated in a case such as a cylindrical can and a prismatic pouch and then manufactured as a secondary battery.

As a method for manufacturing the electrode assembly, a winding type electrode assembly in which the separator is stacked between the negative electrode and the positive electrode and then wound to manufacture an electrode assembly, a stacking type electrode assembly in which each of a negative electrode and a positive electrode is cut by a desired width and length, and then, the negative electrode, the separator, the positive electrode are repeatedly stacked to form an electrode assembly, and a stack and folding type electrode assembly in which unit cells are placed parallel to each other on a folding separator and then folded from one side to manufacture an electrode assembly have been known.

Among them, as illustrated in FIG. 1, which illustrates a simplified manufacturing process, in the stacking type electrode assembly, a positive electrode 1, a separator 3, and a negative electrode 2 are stacked in a predetermined number to manufacture a unit cell 4, and then, the unit cells 4 are stacked in a predetermined number to manufacture an electrode assembly.

When the unit cells 4 are stacked in the predetermined number, a tape 5 is attached to side surfaces of the unit cells so as to fix the electrode assembly, thereby binding the unit cells.

However, in the structure that binds the unit cells through the tape 5, the tape 5 may protrude from a surface of the electrode assembly to form an uneven outer surface. As a result, the tape 5 may not be properly bound to cause release of the binding, wrinkle defects, or outer appearance defects.

Furthermore, during the stacking of the unit cells 4, the stacked unit cells 4 may not be fixed to each other to cause misalignment in the stacking direction by external factors or process errors.

SUMMARY OF THE INVENTION

An aspect of the present invention provides a method for manufacturing an electrode assembly, in which is capable of fixing unit cells without attaching a tape and preventing the unit cells from being misaligned, and an electrode assembly.

According to another aspect of the present invention, there is provided an electrode assembly in which a negative electrode, a separator, and a positive electrode are repeatedly stacked, the electrode assembly including: a first unit cell in which the negative electrode, the separator, the positive electrode, the separator, and the negative electrode are sequentially stacked; a second unit cell in which the positive electrode, the separator, the negative electrode, the separator, and the positive electrode are sequentially stacked; and a separator pouch made of the same material as the separator and bonded to surround at least one or more of the first unit cell or the second unit cell so that a separator is additionally disposed at the uppermost layer and the lowermost layer of the surrounded unit cells, wherein, after surrounding the unit cells, surplus portions of the separator pouch protrude, wherein the first unit cell and the second unit cell are alternately stacked, and the surplus portions are bonded to each other in the stacking direction.

Although the separator pouch is bonded to all the first unit cell and the second unit cell, the separator pouch may be bonded to one of the two unit cells to reduce production costs and a weight.

The separator pouch may be an expanded separator having a length greater than twice the separator provided in the first unit cell or the second unit cell, the expanded separator may be folded to cover top and bottom surfaces of the first unit cell or the second unit cell, and the surplus portions of the expanded separator, which protrude from the first unit cell or the second unit cell, may adhere to each other.

Although the first unit cell or the second unit cell, to which the separator pouch is bonded, is disposed at at least one side of the upper and lower outermost layers, the first unit cell or the second unit cell, to which the separator pouch is bonded, may be disposed on all both the upper and lower outermost layers.

A monocell which is disposed at the outermost layer and in which 'the positive electrode, the separator, the negative electrode, and the separator' or 'the negative electrode, the separator, the positive electrode, and the separator' are sequentially stacked may be additionally stacked outside the first unit cell or the second unit cell to which the separator pouch is bonded.

The separator provided in the monocell may have an area greater than that of each of the positive electrode and the negative electrode, and an end of the monocell may adhere to each of the surplus portions of the separator pouch.

A method for manufacturing an electrode assembly, in which a negative electrode, a separator, and a positive electrode are repeatedly stacked, is additionally provided. According to another aspect of the present invention, there is provided a method for manufacturing an electrode assembly, including: providing a first unit cell, in which the negative electrode, the separator, the positive electrode, the separator, and the negative electrode are sequentially stacked, and a second unit cell, in which the positive electrode, the separator, the negative electrode, the separator, and the positive electrode are sequentially stacked; surrounding the first and second unit cells by using an expanded separator having a length greater than twice the separator provided in the first unit cell or the second unit cell to bond separator pouches to one or more of the first unit cell and the second unit cell; alternately stacking the first unit cell and the second unit cell; and bonding surplus portions of the separator pouches to each other in the stacking direction.

The first unit cell and the second unit cell may be stacked so that one of the first unit cell and the second unit, to which the separator pouches are bonded, is disposed at each of the uppermost layer and the lowermost layer of the electrode assembly.

A monocell which is disposed at the outermost layer and in which 'the positive electrode, the separator, the negative electrode, and the separator' or 'the negative electrode, the separator, the positive electrode, and the separator' are sequentially stacked may be additionally stacked outside the first unit cell or the second unit cell to which the separator pouch is bonded, and the method may further include allowing an end of the separator provided in the monocell to adhere to each of surplus portions of the separator pouches.

The bonding between the surplus portions of the separator pouches may be performed by applying heat and a pressure.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
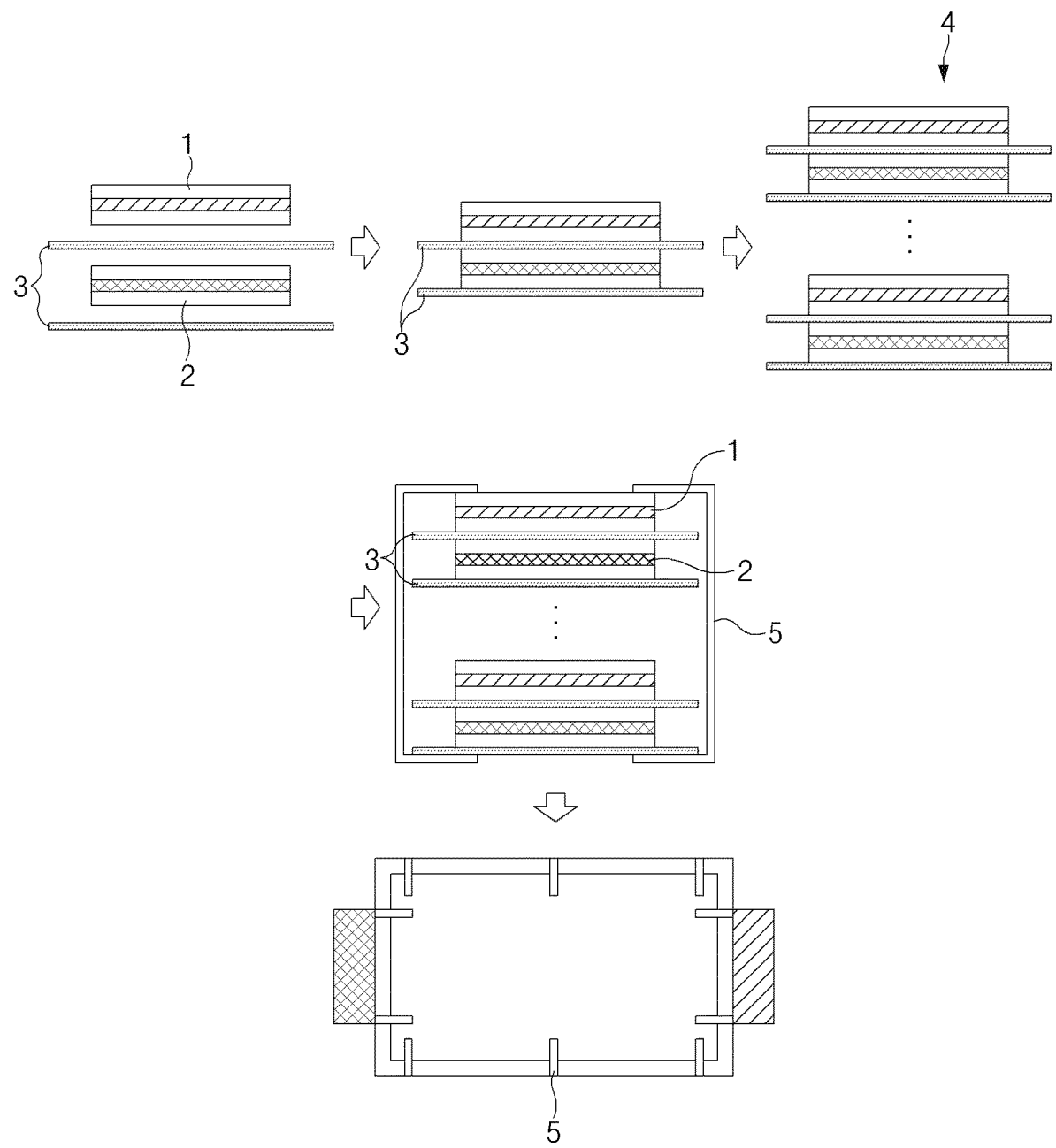
FIG. 1 is a view illustrating a state in which a positive electrode, a separator, a negative electrode, and a separator are stacked to manufacture a unit cell according to a method for manufacturing a stacking type electrode assembly according to a related art and a state in which the stacked unit cells are bound by a tape.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a method for manufacturing an electrode assembly, which is capable of removing a tape configured to prevent stacking failures of unit cells from occurring and bind unit cells to each other, and an electrode manufactured through the manufacturing method. Hereinafter, embodiments according to the present invention will be described in more detail with reference to the accompanying drawings.

First Embodiment

A method for manufacturing an electrode assembly in which a negative electrode 20, a separator 30, and a positive electrode 10 are repeatedly stacked according to a first embodiment of the present invention is provided.

Figure 5:
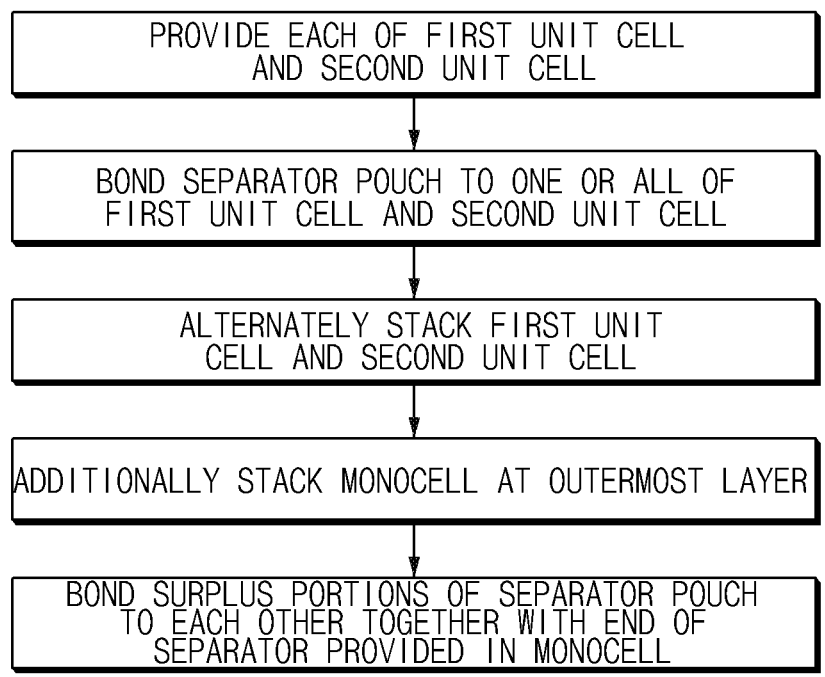
FIG. 5 is a flowchart illustrating a method for manufacturing an electrode assembly according to the present invention.

Referring to FIG. 5, which illustrates a flowchart of the method for the electrode assembly according to the present invention, the method for manufacturing the electrode assembly according to this embodiment includes a step of providing (manufacturing) each of a first unit cell 100 and a second unit cell 200, a step of bonding a separator pouch 40 to one of the first unit cell 100 and the second unit cell 200, a step of alternately stacking the first unit cell 100 and the second unit cell 200, and a step of bonding surplus portions 41 of the separator pouch 40 to each other. Also, as necessary, when a monocell 300 is selectively additionally stacked, the method for manufacturing the electrode assembly may include a step of additionally stacking the monocell 300 at the outermost layer and a step of bonding the separator 30 together with the surplus portions of the separator pouch 40.

Figure 2A:
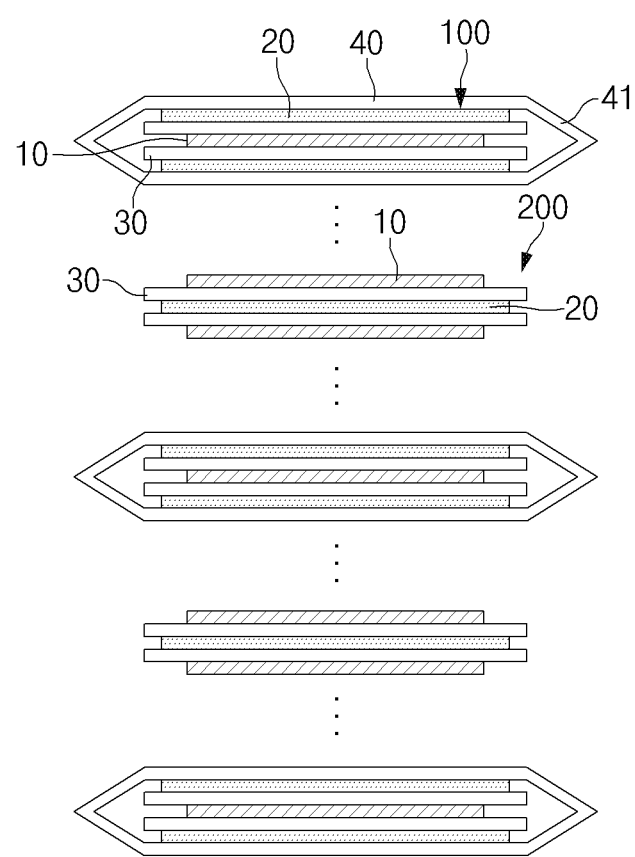
FIG. 2a is a side view illustrating a state in which a separator pouch is bonded to a first unit cell, i.e., a state in which the first unit cell and a second unit cell are sequentially stacked.
Figure 2B:
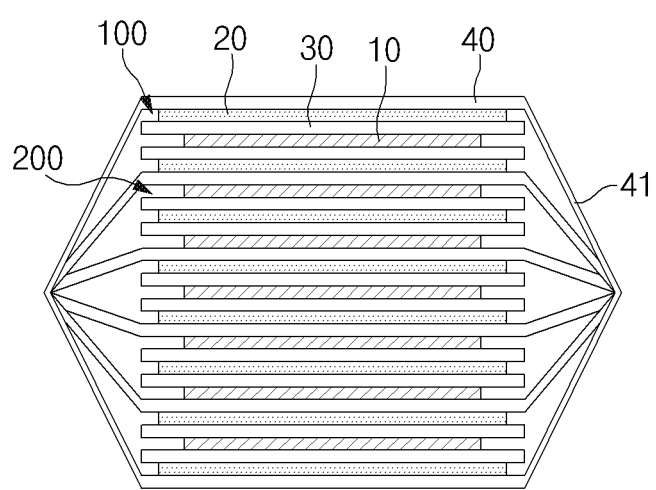
FIG. 2b is a side view illustrating a state in which surplus portions of the separator pouches are bonded to each other after the first unit cell and the second unit cell are sequentially stacked.

FIG. 2a illustrates a state in which the separator pouch 40 is bonded to the first unit cell 100, i.e., is a side view illustrating a state in which the first unit cell 100 and the second unit cell 200 are sequentially stacked, and FIG. 2b is a side view illustrating a state in which the surplus portions 41 of the separator pouches are bonded to each other after the first unit cell 100 and the second unit cell 200 are sequentially stacked.

As illustrated in the drawings, according to the present invention, the first unit cell 100 is provided to be stacked in order of a negative electrode 20, a separator 30, a positive electrode 10, a separator 30, and a negative electrode 20, and the second unit cell 200 is provided to be stacked in order of a positive electrode 10, a separator 30, a negative electrode 20, a separator 30, and a positive electrode 10.

Figure 3A:
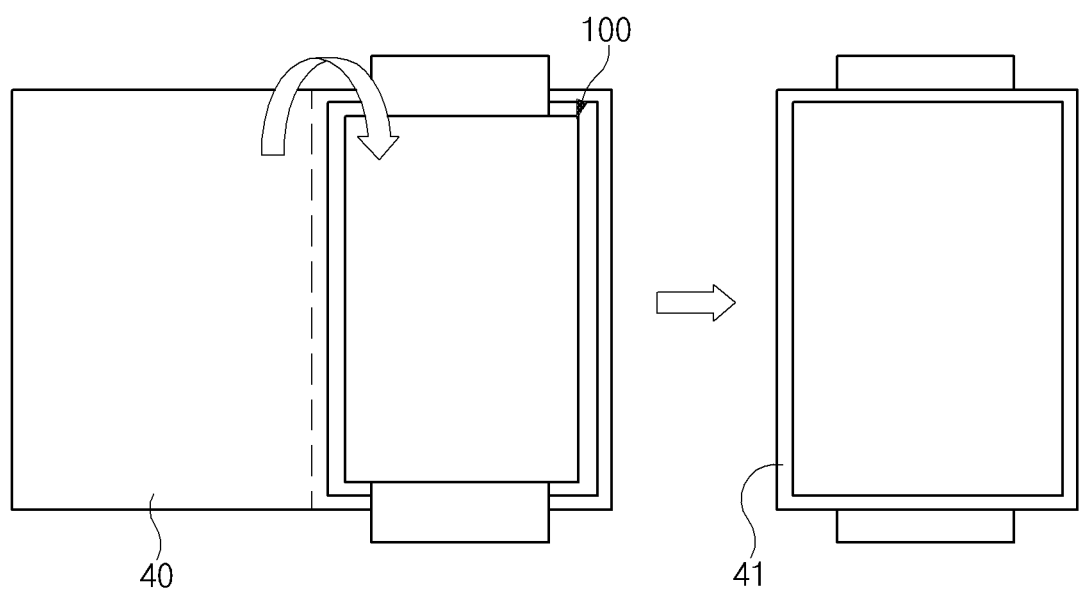
FIG. 3a is a plan view illustrating a state in which an expanded separator is folded to allow the separator pouch to be bonded to the first unit cell after the first unit cell is seated on the expanded separator.
Figure 3B:
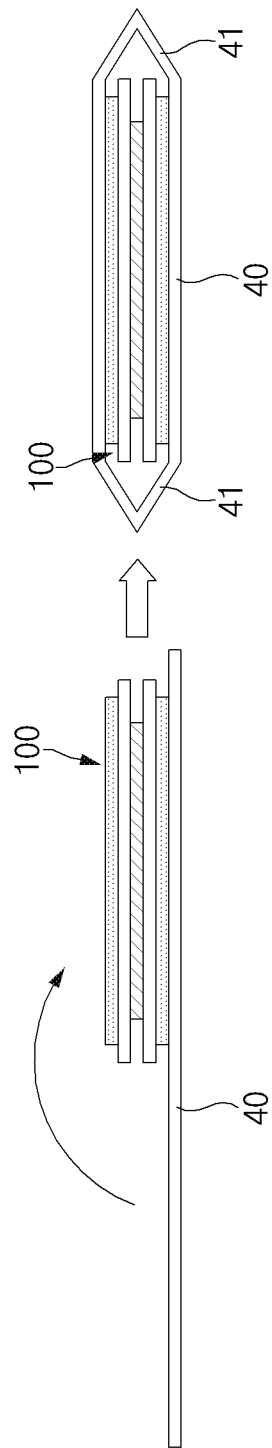
FIG. 3b is a side view illustrating a state in which the expanded separator is folded to allow the separator pouch to be bonded to the first unit cell after the first unit cell is seated on the expanded separator.

Also, as illustrated in FIGS. 3A and 3b, which illustrate a state in which an expanded separator is folded to allow the separator pouch 40 to be bonded to the first unit cell 100 after the first unit cell 100 is seated on the expanded separator, the first unit cell 100 is surrounded by the expanded separator having a length greater than twice the separator 30 provided in each of the first unit cell 100 and the second unit cell 200.

The expanded separator may be made of the same material as the separator 30 provided in each of the first unit cell 100 and the second unit cell 200. After surrounding the first unit cell 100, both ends of the expanded separator may be bonded (by heat and a pressure) as illustrated in a right figure of FIG. 3b. As described above, as the expanded separator is bonded to the first unit cell 100, the separator pouch 40 is provided. The expanded separator may have a sufficient length so that each of the surplus portions 41 protruding by a predetermined length to both sides of the first unit cell 100 is formed on the separator pouch 40.

Although the separator pouch 40 is bonded to only the first unit cell in the drawings, the present invention is not limited thereto. For example, the separator pouch 40 may be bonded to the second unit cell 200 instead of the first unit cell 100. Alternatively, the separator pouch 40 may be bonded to all the first unit cell 100 and the second unit cell 200.

Also, as illustrated in FIG. 2a, the first unit cell 100 and the second unit cell 200, to which the separator pouch 40 is bonded, are alternately stacked. Here, the negative electrode 20 disposed at the outermost layer of the first unit cells 100 and the positive electrode 10 disposed at the outermost layer of the second unit cells 300 are separated from each other by the separator pouches 40.

After the first unit cells 100 and the second unit cells 200 are stacked, as illustrated in FIG. 2b, the surplus portions 41 of the separator pouches 40 are bonded to each other in the stacking direction.

Here, the surplus portions 41 may be bonded to each other in a state in which the first unit cell 100 to which the separator pouch 40 is bonded is placed at the outermost layers (the uppermost layer and the lowermost layer) so that all the first unit cell 100 and the second unit cell 200 are bound to each other.

Furthermore, the surplus portions 41 of the separator pouches 40 bonded to the first unit cells 100 may have lengths different from each other. For example, as illustrated in FIG. 2a, when a point at which the surplus portions 41 are bonded to each other is formed at a center in the stacking direction of the electrode assembly, the surplus portion 41 of the separator pouch 40, which is disposed at an intermediate layer, may have the shortest length, and the surplus portion 41 of the separator pouch 40, which is disposed at the outermost side, may have the longest length. Also, when the point at which the surplus portions 41 are bonded to each other is disposed at a lower side, the surplus portion 41 of the separator pouch 40, which is disposed at the uppermost layer, may have the longest length, and the surplus portion 41 of the separator pouch 40, which is disposed at the lowermost layer, may have the shortest length.

Figure 4:
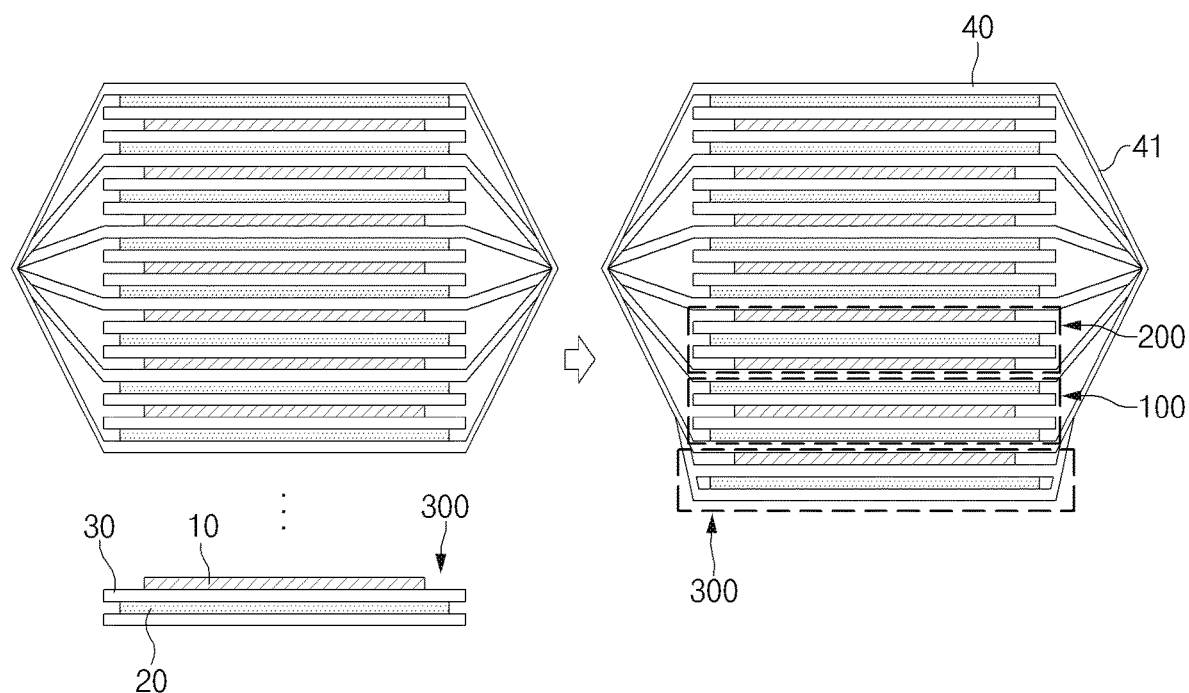
FIG. 4 is a side view illustrating a state in which a monocell is additionally stacked on a lower portion of the electrode assembly of FIG. 2b.

Also, as illustrated in FIG. 4, which illustrates a state in which the monocell is additionally stacked on a lower portion of the electrode assembly of FIG. 2b, the manufacturing method may further include a step of attaching the monocell 300 to the first unit cell 100 which is disposed at the outermost layer and to which the separator pouch 40 is bonded.

The monocell 300 has a structure in which 'a positive electrode 10, a separator 30, a negative electrode 20, and a separator 30' or 'a negative electrode 20, a separator 30, a positive electrode 10, and a separator 30' are sequentially stacked. The monocell 300 is provided in plurality to be stacked. An end of the separator 30, which is provided in the monocell 300, has a length greater than that of each of the positive electrode 10 and the negative electrode 20, which are provided in the monocell 300, and both ends of the monocell 300 adhere together with the surplus portion 41 of the separator pouch 40 by heat and a pressure. That is, at least one of the separators provided in the monocell 300 has a length that is sufficient to adhere to the surplus portion 41 of the separator pouch 40.

Second Embodiment

The electrode assembly manufactured by the manufacturing method according to the first embodiment of the present invention will be described according to a second embodiment.

As illustrated in FIG. 2b, an electrode assembly according to this embodiment has a structure in which a first unit cell 100 and a second unit cell 200 are repeatedly stacked. Here, the first unit cell 100 has a structure in which a negative electrode 20, a separator 30, a positive electrode 10, a separator 30, and a negative electrode 20, and a separator pouch 40 are sequentially stacked, and a separator pouch 40 is disposed at the outermost layer. Also, the second unit cell 200 has a structure stacked in order of a positive electrode 10, a separator 30, a negative electrode 20, a separator 30, and a positive electrode 10.

The separator pouch 40 is made of the same material as the separator 30 provided in each of the first unit 100 and the second unit cell 200 and has a structure that is coupled to surround the first unit cell 100 and includes surplus portions protruding to both sides.

Also, the first unit cell 100 and the second unit cell 200 are alternately stacked, and the surplus portions 41 of the separator pouches 40 are bonded to each other in the stacking direction.

Here, although the separator pouch 40 is bonded to all the first unit cell 100 and the second unit cell 200, the separator pouch 40 may be bonded to one of the two unit cells 100 and 200.

As illustrated in FIG. 2b, in the electrode assembly according to the second embodiment, although a space S is formed at that portion at which the surplus portions 41 are bonded to each other, the surplus portions 41 may be in close contact with side surfaces of the electrode assembly without generating the space S.

For example, after the surplus portions 41 are bonded to each other, a process of allowing the bonded point to be in close contact with each of the side surfaces of the electrode assembly is additionally performed. In addition, even if the electrode assembly is manufactured in the state in which the space S is generated, the space S may be reduced in the follow-up processes, such as when being inserted later into the pouch or when a negative pressure is generated in a degassing process after an electrolyte is injected.

Also, as described above, it may be possible to minimize the space S by varying the lengths of the surplus portions 41 of each layer.

Third Embodiment

An electrode assembly in which a monocell 300 is additionally bonded to the electrode assembly according to the second embodiment will be described according to a third embodiment of the present invention.

As illustrated in FIG. 5, the monocell 300 is selectively added and stacked at at least one point of the outermost layers (the uppermost layer and the lower most layer) of the electrode assembly in which the first unit cell 100 and the second unit cell 200 are stacked and bonded to each other according to the second embodiment.

The monocell 300 according to the present invention has a structure in which 'a positive electrode 10, a separator 30, a negative electrode 20, and a separator 30' or 'a negative electrode 20, a separator 30, a positive electrode 10, and a separator 30' are sequentially stacked according to whether the first unit cell 100 or the second unit cell 200 is disposed at the outermost side. Here, the separator 30 is stacked to be disposed at the outermost layer.

The separator 30 provided in the monocell 300 has an area and length, which are greater than those of each of the positive electrode 10 and the negative electrode 20, and an end of the separator 30 is bonded to a surplus portion 41 of a separator pouch 40.

Here, although the separator, which disposed at the outermost layer among the separators provided in the monocell 300, may be bonded to the separator pouch 40, if the monocell 300 has a structure in which the positive electrode 10, the separator 30, and the negative electrode are stacked to adhere to each other, any separator may be bonded to the separator pouch 40 without being limited to the outermost separator.

According to the present invention having the above technical features, the separator pouch 40 may be bonded to at least one or more of the first unit cell 100 or the second unit cell 200, and the surplus portions 41 of the separator pouch 40 may be bonded to each other to bind the unit cells without using the tape according to the related art.

Furthermore, the first unit cell 100 or the second unit cell 200 may be stacked in the state in which the separator pouch is surrounded by the separator pouch 400 so as to be interrupted in movement, thereby significantly reducing the possibility of the stacking failure.

Also, the monocell 300, in which 'the positive electrode 10, the separator 30, the negative electrode 20, and the separator 30' or 'the negative electrode 20, the separator 30, the positive electrode 10, and the separator 30' are sequentially stacked, may be additionally stacked to adjust the number of positive electrodes 10 and negative electrodes 20 to be stacked.

According to the present invention having the above configuration, the separator pouch may be bonded to at least one or more of the first unit cell or the second unit cell, and the surplus portions of the separator pouch may be bonded to each other to bind the unit cells without using the tape according to the related art.

Furthermore, the first unit cell or the second unit cell may be stacked in the state in which the separator pouch is surrounded by the separator pouch so as to be interrupted in movement, thereby significantly reducing the possibility of the stacking failure.

Also, the monocell stacked in the order of 'the positive electrode, the separator, the negative electrode, and the separator' or 'the negative electrode, the separator, the positive electrode, and the separator' may be additionally stacked to additionally adjust the number of positive electrodes and negative electrodes.

While the embodiments of the present invention have been described with reference to the specific embodiments, it will be apparent to those skilled in the art that various changes and modifications may be made without departing from the spirit and scope of the invention as defined in the following claims.

What is claimed is:

1. An electrode assembly, comprising:
   first unit cells in which a first negative electrode, a first separator, a positive electrode, a second separator, and a second negative electrode are sequentially stacked;
   second unit cells in which a first positive electrode, a first separator, a negative electrode, a second separator, and a second positive electrode are sequentially stacked; and
   separator pouches made of a same material as each of the separators and bonded to and surrounding respective ones of the first unit cells or the second unit cells so that portions of each separator pouch comprise an uppermost layer and a lowermost layer of the respective surrounded unit cell, wherein a surplus portion of each separator pouch protrudes in a lateral direction beyond peripheral ends of the first unit cells and the second unit cells,
   wherein the first unit cells and the second unit cells are alternately stacked with one another in a stacking direction perpendicular to the lateral direction, and
   the surplus portions of the separator pouches are bonded to each other,
   wherein each separator pouch is an expanded separator having a first length greater than twice of a second length of the first and second separators provided in the first unit cells and the second unit cells, and each expanded separator is folded to cover top and bottom surfaces of the respective one of the first unit cells or second unit cells to which it is bonded.

2. The electrode assembly of claim 1, wherein the separator pouches are bonded to only the first unit cells or only the second unit cells.

3. The electrode assembly of claim 1, wherein a respective one of the separator pouches is disposed at one of the upper and lower outermost layers of the electrode assembly.

4. The electrode assembly of claim 3, wherein a monocell comprising a positive electrode, a first separator, a negative electrode, and a second separator is stacked adjacent to the respective one of the separator pouches that is disposed at the one of the upper and lower outermost layers of the electrode assembly.

5. The electrode assembly of claim 4, wherein the separators provided in the monocell each have a third length greater than the second length of the first and second separators provided in the first unit cells and the second unit cells, and
    an end of each of the separators of the monocell is adhered to the surplus portion of the respective one of the separator pouches.

6. A method for manufacturing an electrode assembly, the method comprising:
    providing first unit cells, in which a first negative electrode, a first separator, a positive electrode, a second separator, and a second negative electrode are sequentially stacked, and second unit cells, in which a first positive electrode, a first separator, a negative electrode, a second separator, and a second positive electrode are sequentially stacked;
    surrounding either the first or second unit cells with respective expanded separators having a first length greater than twice of a second length of the first and second separators provided in the first unit cells and the second unit cells to form respective separator pouches so that portions of each separator pouch comprise an uppermost layer and a lowermost layer of the respective surrounded unit cell, wherein a surplus portion of each separator pouch protrudes in a lateral direction beyond peripheral ends of the first unit cells and the second unit cells;
    alternately stacking the first unit cells and the second unit cells with one another in a stacking direction; and
    bonding the surplus portions of the separator pouches to each other,
    wherein each expanded separator is folded to cover top and bottom surfaces of the respective one of the first unit cells or second unit cells to which it is bonded.

7. The method of claim 6, wherein a respective one of the separator pouches is disposed at one of the uppermost layer or the lowermost layer of the electrode assembly.

8. The method of claim 6, wherein a monocell comprising a positive electrode, a first separator, a negative electrode, and a second separator is stacked adjacent to the respective one of the separator pouches that is disposed at the one of the uppermost layer or the lowermost layer of the electrode assembly, and
    the method further comprises adhering an end of each of the separators of the monocell to the surplus portion of the respective one of the separator pouches.

9. The method of claim 6, wherein the bonding of the surplus portions of the separator pouches to each other is performed by applying heat and a pressure.

10. The method of claim 6, wherein the separator pouches are bonded to only the first unit cells or only the second unit cells.

* * * * *